United States Patent [19]

Marschik et al.

[11] Patent Number: 4,982,571
[45] Date of Patent: Jan. 8, 1991

[54] SAFETY APPARATUS FOR SUPERCONDUCTING MAGNETIC ENERGY STORED SYSTEM

[75] Inventors: David Marschik, Murrysville; James R. Logan, Hampton Twp., both of Pa.

[73] Assignee: Westinghouse Electric Corp., Pittsburgh, Pa.

[21] Appl. No.: 389,098

[22] Filed: Aug. 3, 1989

[51] Int. Cl.$^5$ ............................................. F25B 19/00
[52] U.S. Cl. ......................................... 62/51.1; 60/533; 174/15.4; 335/216; 417/379; 505/897
[58] Field of Search .................... 60/533; 417/379; 62/50.4, 50.3, 51.1; 505/897; 174/15.4; 335/216

[56] References Cited

U.S. PATENT DOCUMENTS

| | | | |
|---|---|---|---|
| 2,881,596 | 4/1959 | Sheen | 62/50.1 |
| 3,263,433 | 8/1966 | Fitt | 62/50.2 |
| 3,349,209 | 10/1967 | Zar | 200/166 |
| 3,828,152 | 8/1974 | Charmeil et al. | 60/533 |
| 4,001,738 | 1/1977 | Terracol et al. | 335/16 |
| 4,024,363 | 5/1977 | Marsing et al. | 200/83 |
| 4,240,053 | 12/1980 | Nelson et al. | 71/100 |
| 4,525,612 | 6/1985 | Kawashima | 200/147 |
| 4,654,491 | 3/1987 | Maier et al. | 33/20 |
| 4,656,444 | 4/1987 | McKee et al. | 77/10 |
| 4,689,439 | 8/1987 | Sato | 174/15 |

FOREIGN PATENT DOCUMENTS

| | | |
|---|---|---|
| 3034885 | 9/1980 | Fed. Rep. of Germany . |
| 3034886 | 9/1980 | Fed. Rep. of Germany . |
| 639026 | 12/1978 | U.S.S.R. . |

OTHER PUBLICATIONS

"Rings of Power", *Popular Science Magazine*, Freundlich, Naomi J., pp. 67, 104, (Jan. 1989).

*Primary Examiner*—Ronald C. Capossela

[57] ABSTRACT

A self contained, self charging automatic hydraulic activation mechanism (AHAM) for a superconducting energy magnetic storage (SMES) system is disclosed. The AHAM is operatively coupled to arc activated switches disposed across a superconducting coil to automatically close the switches upon a coolant dump. The arc activated switches are also self actuating and close in response to arcing across the switch contacts or across spark gaps provided on the switches.

18 Claims, 3 Drawing Sheets

FIG. 3
(PRIOR ART)
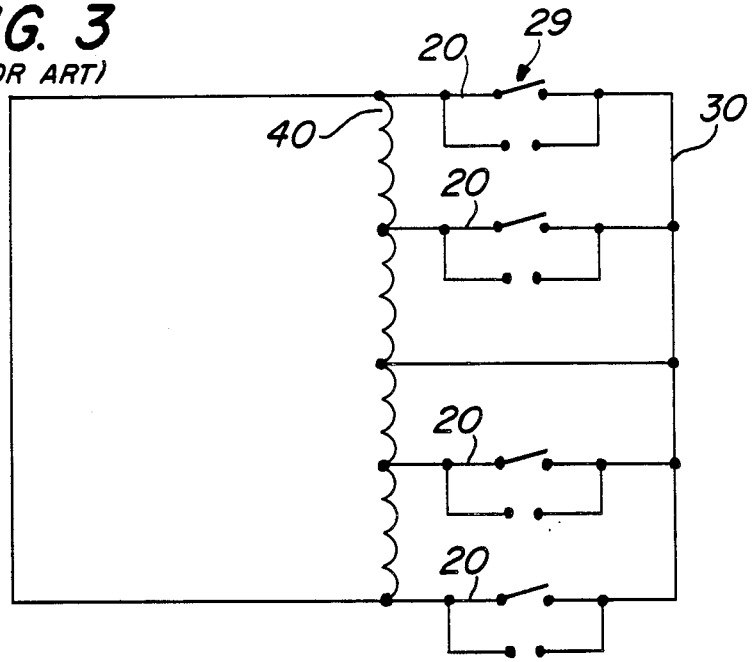
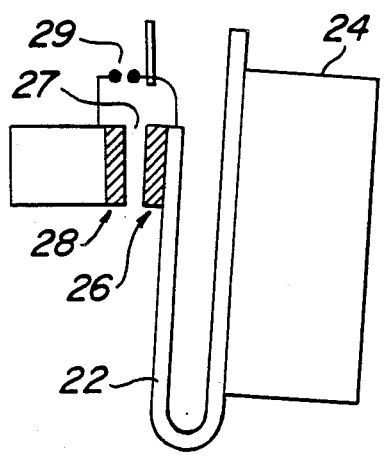
FIG. 4A
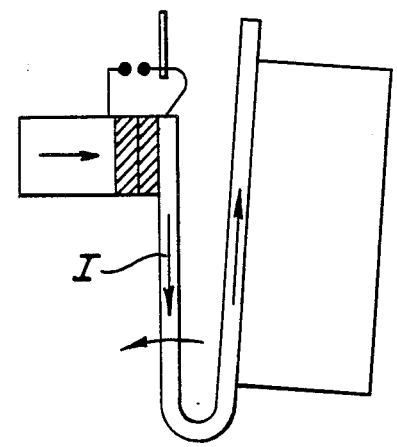
FIG. 4B

SAFETY APPARATUS FOR SUPERCONDUCTING MAGNETIC ENERGY STORED SYSTEM

FIELD OF THE INVENTION

This invention generally relates to superconducting magnetic energy storage (SMES) systems. More particularly, this invention relates to an apparatus for preventing damage caused by arcing that occurs when excessively high voltages are developed on a superconducting coil when it is quenched, particularly during a coolant dump.

BACKGROUND OF THE INVENTION

Superconducting inductors for SMES systems are large coils that are usually hundreds or thousands of feet in diameter. Such inductors are capable of storing large amounts of energy in magnetic fields surrounding the coils. They are very efficient for these purposes because no energy is lost to resistive heating in the superconducting current path. The inductors are operated at cryogenic temperatures by immersing the superconducting coil into a dewar of cryogenic coolant such as liquid helium. The cryogenic coolant also functions as an electrical insulator between the coil and the dewar holding the coolant.

Every superconducting material has a critical temperature above which the material is no longer superconducting. If a region of a superconducting inductor losses its superconducting property, i.e., becomes normal or "quenches", joule heating of the normal region occurs. If sufficient joule heating occurs, the normal zone propagates, or grows larger. This joule heating can lead to catastrophic damage to the coil because, as the temperature rises, the resistivity of the superconducting material increases rapidly, causing large voltage differentials to develop across portions of the coil. If the voltage differentials become large enough, arcing can occur from the coil to the dewar. In the event of a coolant dump, arcing is even more likely to occur since the coolant pool acts as an insulator between the coil and the dewar. One method of avoiding damage to the coil when a quench zone develops is to quickly dissipate the energy stored in the inductor. This is usually done by means of "dump resistors" that shunt the energy away from the quench zone.

The rate at which energy can be removed from the inductor at its terminals is limited by the voltage rating of the SMES system for reasons described below. The voltage rating depends upon, among other things, the electrical insulation provided by the coolant pool in which the coil is immersed. When the voltage on the coil exceeds the voltage rating, there is a possibility of uncontrolled arcing and catastrophic damage to the coil.

The rate at which energy (i.e., power) is drained from the inductor at its terminals is equal to the voltage (V) at the terminals times the current (I) through the inductor, or:

$$power = V*I,$$

where V is the voltage across the inductor terminals and I is the current through the inductor. As the inductor is discharged, i.e., as the energy is drained, the current decreases. Therefore, to remove energy at a constant rate, voltage must increase. This means that the energy cannot usually be drained from the inductor at its terminals quickly enough to avoid arcing between the inductor and the dewar. Discharging through its terminals usually takes hours because of maximum voltage specifications. But, to avoid damage, the inductor must be discharged in a period of minutes.

For quick discharging at points other than at the terminals, SMES coils are usually designed with some type of internal dump resistors. During a coolant dump, the cryogenic coolant is drained and usually replaced with a warm gas, thus allowing the coil to quench. The coil is designed so that when the superconductor quenches, the current shifts to a relatively massive conducting, but not superconducting, structure which is parallel to and physically supports the superconductor. This massive structure serves as the internal dump resistor. For example, in the case of FIG. 6, 42 represents the superconductors and 44 represents the massive supporting structure which functions as the dump resistor. Structure 44 has enough mass to dissipate all of the electrical energy without an excessive rise in temperature. When the current shifts to this structure, however, the system becomes very lossy, with resistance and inductance distributed along the length of the coil. The resistive voltage generated as the inductor discharges to the structure is partially offset by an opposing voltage, or back EMF, generated by the inductor. This cancelling of the resistive and inductive voltages along the length of the inductor allows energy dissipation at a much higher power than would be possible if the dump resistor was external to the inductor. This technique of dissipating the energy into the surrounding structure is referred to as an internal energy dump.

Although the voltages on the coil are orders of magnitude lower during an internal energy dump than when draining energy externally, arcing may result. During normal operation the coil is insulated by the cryogenic cooling fluid, which, as mentioned, may be liquid helium. Although liquid helium is a good electrical insulator, during a coolant dump the liquid helium is usually replaced with warmer gas, for example gaseous helium, which is a much poorer insulator. The voltages on the coil during a coolant dump often exceed the insulating capabilities of gaseous helium. To avoid arcing through the gaseous helium, the voltages on the coil may be decreased by placing "shorting" switches periodically, or at fixed intervals, along the coil. The result is that rather than one large LR circuit there are a number of smaller LR circuits all discharging in parallel. The shorting switches, when closed, serve to provide a controlled current path between the coil and some fixed voltage point, for example a bus bar.

FIG. 3 schematically illustrates the aforementioned shorting switch placement as known in the prior art. The peak voltage in the circuit of FIG. 3 is approximately inversely proportional to the square of the number of shorting switches. These shorting switches are critical to the survival of the inductor. If they do not close prior to the dump, the coil's maximum voltage rating may be exceeded and arcing may occur. Means are therefore usually provided to ensure that arcing occurs at known locations selected to minimize damage, and to ensure that they are extinguished as rapidly as possible.

There must be some means for actuating the shorting switches. The prior art teaches a variety of means for actuating shorting switches that are internal to the dewar. These include: (1) pushrods passing through the dewar, where the motive agent is external to the dewar; (2) an electrically activated solenoid and plunger; (3) hydraulics, with hydraulic pressure supplied by a line passing through the dewar; and, (4) hydraulics, with hydraulic pressure supplied by boiling a cryogenic liquid in the hydraulic system internal to the dewar. The liquid is boiled by resistive heating.

All of the above means require penetration of the dewar so that the energy can be transferred into the dewar to mechanically actuate the shorting switches. Moreover, these require either operator or control system intervention to initiate mechanical motion at the start of a coolant dump.

Other known means for controlling arcing in SMES systems include the utilization of spark gaps, which do not require mechanical motion. However the use of spark gaps creates a number of problems for this application. First, known spark gaps cannot handle the high energy involved in large SMES systems. Second, known spark gaps would necessarily have sacrificial contacts that would vaporize, contaminating the local area of the coil. Third, known spark gaps would become very hot, overheating the local region of the coil.

It is therefore desirable to provide a simple and reliable apparatus and method for automatically closing the shorting switches without operator intervention whenever the cryogenic coolant is dumped by means which do not penetrate the dewar. The present invention achieves this goal.

SUMMARY OF THE INVENTION

The present invention provides a method and apparatus for automatically protecting a superconducting magnetic energy storage (SMES) system. According to the invention, a superconducting coil immersed in a cryogenic coolant is protected from damage caused by uncontrolled arcing by switch means for shorting the superconducting coil, and actuation means for automatically actuating the switch means whenever the coolant is dumped. The switch means can be self actuating (employing Lorentz forces), or can be actuated by the actuation means. Both the switch means and actuation means are completely contained within the dewar and therefore no dewar penetration is required.

In the most preferred embodiment of the invention the actuation means comprises an automatic hydraulic activation mechanism (AHAM) comprising: (a) at least one hydraulic working fluid reservoir containing a working fluid; (b) at least one closing cylinder disposed to actuate a shorting switch upon an increase in working fluid pressure; and, (c) means for communicating the increase in working fluid pressure to the closing cylinder. The working fluid is kept in thermal contact with the cryogenic coolant. If manual override capability is desired, electrical means for heating the working fluid may also be provided. According to a most preferred embodiment, the hydraulic working fluid reservoir, the closing cylinder and the communicating means are all disposed inside the dewar and the system is self charging, so that no dewar penetration is required to implement the AHAM.

Further, in the most preferred embodiment, the switch means comprise self actuating arc-activated switches. Two alternative embodiments of the arc-activated switches are disclosed, but importantly, both are self actuating. The first embodiment comprises: (a) a moveable current carrying switch arm carrying a contact so as to define a movable contact; and, (b) a separate fixed contact adjacent to and spaced from the movable contact. The interaction of a magnetic field caused by an arc induced current flowing in the moveable switch arm with an ambient magnetic field causes the moveable contact to close onto the fixed contact. The second embodiment of the arc-activated switch comprises: (a) a U-shaped current-carrying member having one leg attached to a fixed mounting support, the other leg being movable and having a contact attached thereto to define a movable contact; and, (b) a separate fixed contact adjacent to and spaced from the movable contact. When an arc induced current flows in the U-shaped member, a Lorentz force causes the legs to separate, thereby closing the movable contact onto the fixed contact. Either embodiment of the arc-activated switch may further comprise a separate spark gap.

BRIEF DESCRIPTION OF THE DRAWINGS

FIG. 3 is a schematic representation of a prior art shorting switch placement along a superconducting coil as employed in the practice of a preferred embodiment of the present invention.

FIGS. 4A and 4B illustrates a preferred embodiment of an arc activated switch in an open state, FIG. 4A, and in a closed state, FIG. 4B, according to a preferred embodiment of the present invention.

DESCRIPTION OF THE PREFERRED EMBODIMENTS

Figures 1, 2:
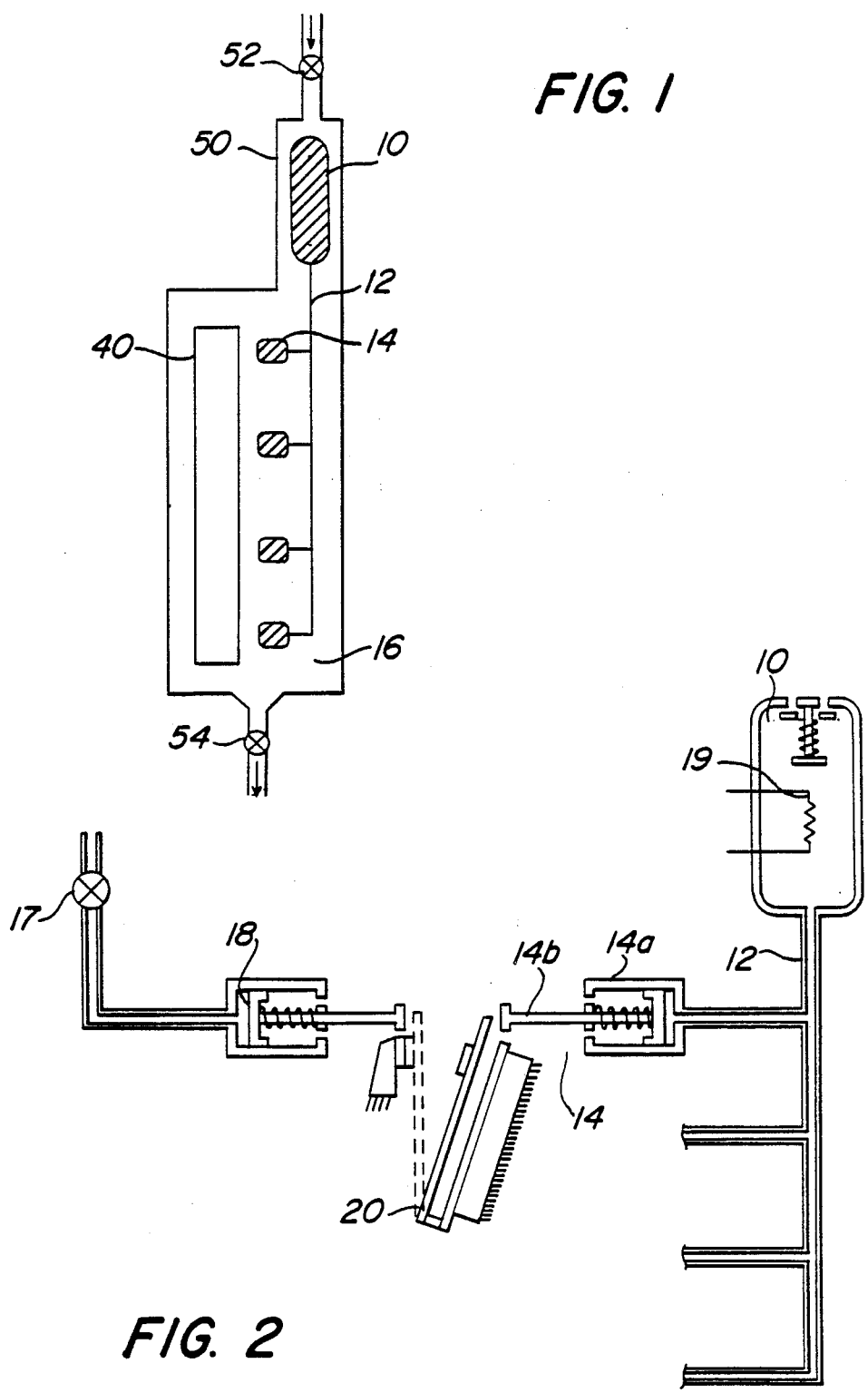
FIG. 1 is an simplified schematic diagram of an automatic hydraulic activation mechanism for an SMES system according to a preferred embodiment of the present invention.
FIG. 2 illustrates an AHAM as used in conjunction with an arc-activated shorting switch according to a preferred embodiment of the present invention.

Referring now to FIG. 1, an AHAM comprises a hydraulic system comprising a hydraulic working fluid reservoir 10, communication lines 12, and hydraulic actuators 14. The hydraulic working fluid reservoir 10 acts as a heat exchanger with, i.e., is in thermal contact with, the warm gas flowing through the warm gas inlet valve 52 during a coolant dump. As the cryogenic coolant is drained through the drain valve 54 it is replaced by warm gas flowing through the warm gas inlet valve 52. The warm gas heats the working fluid in the reservoir 10, causing a pressure rise inside the AHAM, which in turn allows the hydraulic system to perform mechanical work. The increase in pressure is communicated to hydraulic actuators, e.g., closing cylinders 14a (FIG. 2), by means of communication lines 12. The closing cylinders 14a employ means for mechanically actuating shorting switches 20 upon an increase in pressure of the working fluid.

If the mechanical work is to be performed only over a short period of time, the hydraulic system 10, 12, 14 can use the cryogenic coolant as a working fluid, and thus be self charging. In a preferred embodiment, the hydraulic system communicates with the coolant bath 16 (insider dewar 50) either by pin holes or by porous plugs (not shown). The pin holes or porous plugs are located as required in the reservoir, piping and switches to permit the gases trapped in the system at cooldown to be replaced with coolant. When the dewar 50 is filled with the cryogenic liquid (coolant), the coolant seeps into the hydraulic system 10, 12, 14 through the pinholes or porous plugs. When the coolant is dumped through drain valve 54, the reservoir 10 initially heats and pressurizes. The pressure decays as the working fluid leaks out of the hydraulic system 10, 12, 14 through the pin holes or porous plugs. Thus, the pinholes or porous plugs should be of a number and diameter so that the working fluid pressure will be sufficient to actuate the shorting switches 20 before the pressure decays below the minimum pressure required to actuate the switches. Many a useful task, however, such as actuating a bistable switch, requires only a pulse of work so the pressure drop can be relatively quick. If manual override is required for the hydraulic system, a resistive heater 19 can be inserted in the working fluid reservoir 10. Heating the working fluid with a heater will have the same effect as heating the working fluid with the incoming gas flow. The design of the superconducting coil 40 may comprise a superconductor of any well known type, and may incorporate the design illustrated in FIG. 6 and described hereinafter.

Figure 5:
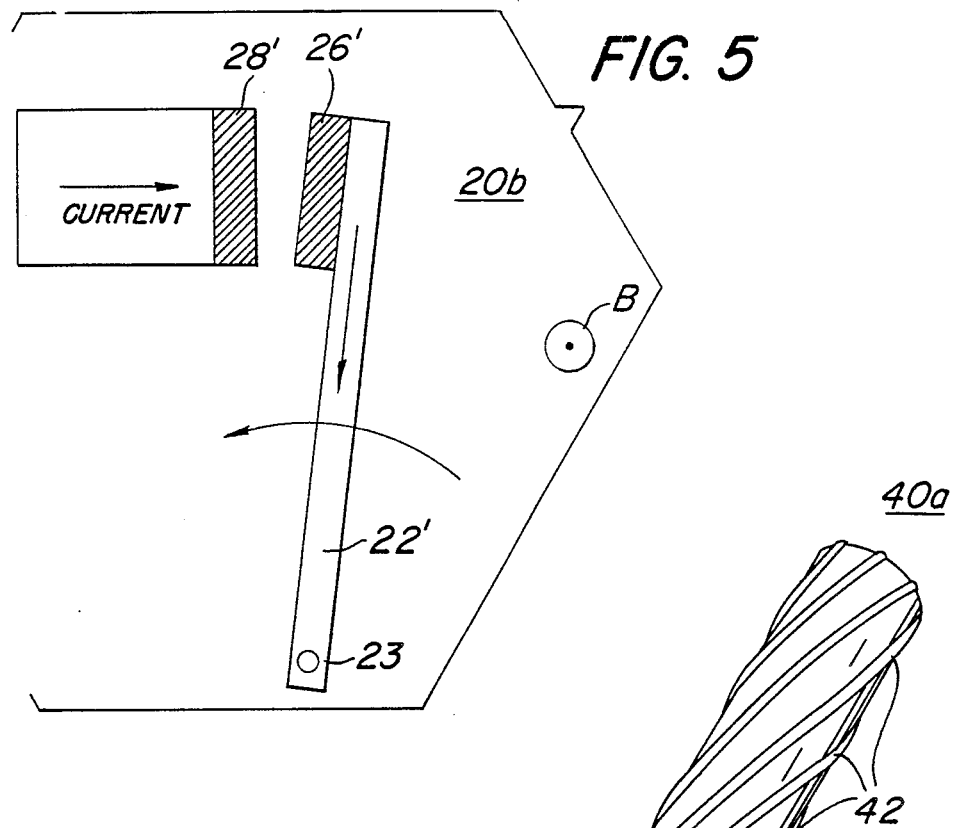
FIG. 5 illustrates an alternate preferred embodiment of an arc-activated switch according to the invention.

FIG. 2 illustrates a preferred embodiment of the AHAM 10, 12, 14. The AHAM employs hydraulic actuators 14, each comprising a closing cylinder 14a and a hydraulically actuated push rod 14b. The hydraulic actuators 14 are each disposed so that when the pressure in the AHAM increases, its push rod 14b actuates (closes) a shorting switch 20, for example, but not limited to, an arc-activated switch 20 of a type described in detail hereinafter (FIGS. 4 and 5). In the most preferred embodiment the arc-activated shorting switches are physically isolated from the coolant bath by placing them within appropriate enclosures (not shown). However, such isolation is not required for practicing the present invention. In the preferred embodiment a resistive heater 19 is provided for heating the working fluid electrically. Further provisions are made for a hydraulic reset mechanism 18 for returning the shorting switches 20 to the open position after they have been closed. The mechanism 18 may be an externally actuable hydraulic piston that reciprocates under control of valve 17. In the preferred embodiment, the reset mechanism is not automatic, and requires operator intervention to activate it.

Referring now to FIG. 3, shorting switches 20 are placed periodically along the superconducting coil 40 in well known fashion. When the shorting switches 20 are closed, the coil 40 is shorted to a bus bar 30. Thus, the AHAM preferably closes all of the switches 20 near simultaneously so that all sections of the coil 40 are shorted to ground in parallel. The peak voltage on the coil will be approximately inversely proportional to the square of the number of shorting switches. Thus, the actual number of shorting switches used will depend on the precise physical embodiment of the SMES.

Referring now to FIG. 4A, one preferred embodiment of an arc-activated switch 20a is depicted in the open position. The arc-activated switch therein depicted consists of a U-shaped current-carrying member 22 having one leg attached to a fixed mounting support 24 as shown. The other leg of the U-shaped member 22 is movable and carries a contact 26 to define a movable contact. There is an air gap 27 separating the moving contact 26 from a fixed contact 28 when the switch is in the open position. In the most preferred embodiment a spark gap 29 is also provided. Thus, either the spark gap 29 or the switch contacts 26, 28 can function as a spark gap. The use of a separate spark gap 29 reduces damage due to arcing between the contacts. It will be apparent to those skilled in the art that the arc-activated switch 20a employs a Lorentz force that separates the fixed leg from the moving leg of the U-shaped member 22 when current flows through the member, as shown, by arrows I (Figure 4B). Thus, when electrical arcs occur between either the switch contacts 26, 28, or between the spark gap 29, an arc induced current will flow through the U-shaped member 22 of the switch 20a as shown in Figure B. This flow of current sets up a Lorentz force that causes the switch to close (FIG. 4B).

Referring now to FIG. 5, therein is depicted an alternative embodiment of an arc-activated switch 20b according to the present invention. As shown, a movable current carrying switch arm 22' carries a contact 26' so as to define a movable contact. There is also a fixed contact 28'. The embodiment of FIG. 5 illustrates an ambient magnetic field B for providing the Lorentz force for closing the switch. Strong magnetic fields are generated in devices such as superconducting magnets and SMES coils and may be employed as the ambient magnetic field B. Current-carrying conductors experience the Lorentz force due to this field B. Thus, the conductor carrying the movable contact does not necessarily have to be looped back on itself or U-shaped, as in the embodiment depicted in FIG. 4, to generate the magnetic field B. In the embodiment of FIG. 5, an arc induced current in the movable switch arm 22' (e.g., induced by arcing across contacts 26', 28') sets up a magnetic field that interacts with the field B and causes the movable contact 26' to close onto the fixed contact 28'. As shown, the arm 22' pivots about a pivot point 23.

While FIG. 4 shows a spark gap 29 separate from the switch contacts 26,28, the embodiment depicted in FIG. 5 assumes that the switch contacts themselves will function as the spark gap. Either method, however, will work with any arc activated switch configuration. As discussed above, the use of a spark gap separate from the switch contacts reduces arc damage to the switch contacts, so in the most preferred embodiment a separate spark gap is provided.

It will therefore be appreciated that both embodiments of the switch 20 may be closed in either one of two ways. First, since the switch is self actuating, it will automatically close when a spark occurs across the spark gaps or switch contacts. Second, the switch 20 may be closed by the AHAM upon a coolant dump.

Figure 6:
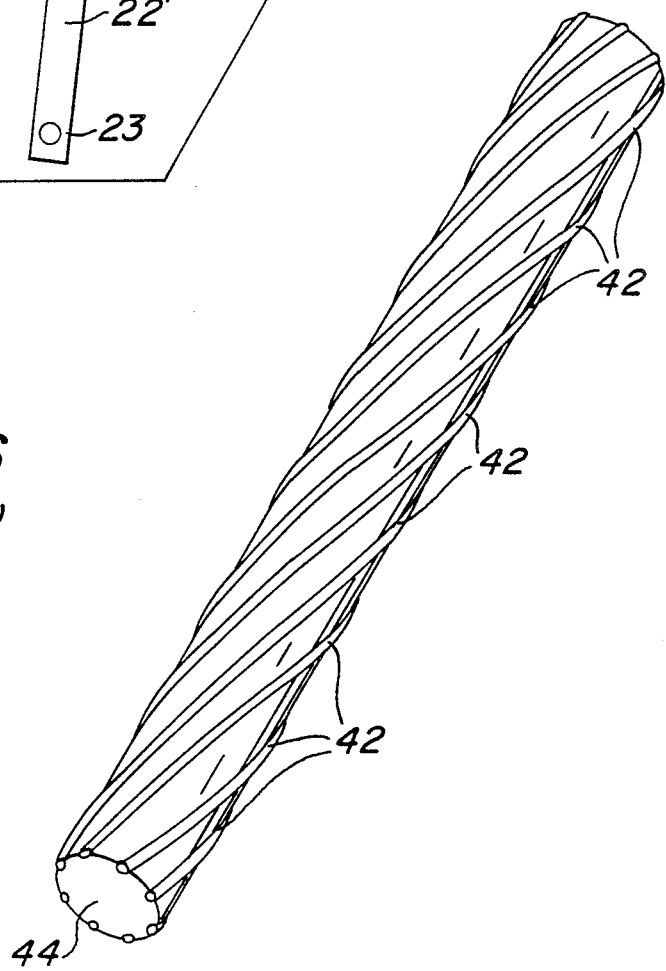
FIG. 6 illustrates the structure of a prior art superconducting conductor that is employed in the practice of a preferred embodiment of the present invention.

Referring now to FIG. 6, therein is depicted a section of a well known superconductor 40a that may be used to construct the coil used in the present invention. The superconductor 40a comprises eight identical small superconductors 42 embedded in and wound around a larger, aluminum non-superconducting conductor 44. In the preferred embodiment, the diameter of the larger conductor 44 is approximately one inch. The diameter of the small conductors 42 is approximately 110 mils.

The arc-activated switch heretofore described requires no active sensors, nominally one moving part, and no externally supplied energy to close when arcing occurs. This makes the switch very simple, and thus very reliable. By closing, the switch quickly extinguishes the arc, thus minimizing damage to the SMES system. As mentioned, the switch can also be operated by any available motive agent, such as the AHAM described herein. Assuming that the switch is being used as a shorting switch, should the AHAM fail to operate, the switch will close when the voltage on the coil exceeds the design limit, and the switch contacts or spark gap arc over. Moreover, the switches provide the preferred arcing location in the SMES system in which they are installed. The switches can be designed to either withstand the damage due to arcing or be easily replaced.

The AHAM heretofore disclosed operates automatically when the coolant is drained from the SMES system; it is self operative and no operator or control system intervention is required to close the switches. The AHAM will normally close the switch as a direct result of a coolant dump. Furthermore, unless a manual override is desired, the AHAM requires no dewar penetration for control or power lines. The AHAM may also be self charging so that no intervention is required to restore it to its original state.

Although preferred embodiments of the present invention have been herein described, it will be appreciated by those having ordinary skill in the art that the essence and breadth of the invention is not so limited. Thus, various modifications may be made without departing from the spirit of the invention, which is intended to be limited solely by the appended claims.

What is claimed is:

1. An automatic hydraulic activation mechanism (AHAM) for performing work in a superconducting magnetic energy storage (SMES) system employing a cryogenic coolant, the AHAM comprising;
    (a) at least one hydraulic working fluid reservoir containing a working fluid in thermal contact with the cryogenic coolant;
    (b) at least one hydraulic actuator disposed to perform work upon an increase in working fluid pressure; and
    (c) communicating means for communicating the increase in working fluid pressure to said hydraulic actuator.

2. AHAM of claim 1 further comprising electrical means for heating the working fluid.

3. AHAM of claim 1 wherein the cryogenic coolant is the hydraulic working fluid.

4. AHAM of claim 3 further comprising porous means for permitting cryogenic coolant in the dewar to seep into the reservoir when in a liquid form and to seep out of the reservoir when in a gaseous form.

5. AHAM according to claim 4 wherein (i) upon a dump of liquid cryogenic coolant from the dewar, liquid cryogenic coolant in the reservoir becomes a gas and expands to provide the increase in working fluid pressure, and the gaseous cryogenic coolant slowly seeps into the dewar through the porous means to slowly decrease the pressure of the working fluid, and (ii) upon a fill of liquid cryogenic coolant into the dewar the coolant seeps into the reservior to recharge the AHAM.

6. AHAM of claim 1 wherein the hydraulic working fluid reservoir, hydraulic actuator, and communicating means are completely disposed within a dewar containing the SMES and cryogenic coolant.

7. AHAM of claim 1 wherein said work comprises closing at least one shorting switch.

8. AHAM of claim 7 wherein said shorting switch comprises: (i) a U-shaped current carrying member having two legs, a first leg being secured to a fixed mounting support and a second leg being movable and carrying a contact defining a movable contact, and (ii) a separate fixed contact adjacent to and spaced from said movable contact; an arc induced current flow in said U-shaped member generating a force that urges said legs apart and closes said movable contact onto said fixed contact.

9. AHAM of claim 8 wherein said shorting switch further comprises a spark gap disposed across the switch, an arc across said spark gap causing current to flow in said U-shaped arm.

10. AHAM of claim 7 wherein said shorting switch comprises: (i) a movable current carrying switch arm carrying a contact defining a movable contact; and (ii) a fixed contact adjacent to and spaced from said movable contact; an arc induced current in said movable switch arm generating a magnetic field that interacts with an ambient magnetic field and thereby results in a force that urges said movable switch arm toward said fixed contact and closes the movable contact onto said fixed contact.

11. AHAM of claim 10 wherein said shorting switch further comprises a spark gap disposed across the switch, an arc across said spark gap causing current to flow in said movable switch arm.

12. AHAM of claim 7 further comprising hydraulic reset means for returning the shorting switch to the open position after it has been closed.

13. AHAM of claim 7 wherein there are a plurality of shorting switches spaced along a superconducting coil of the SMES and the number of shorting switches is substantially inversely proportional to the square root of a peak voltage rating of the coil.

14. AHAM of claim 1 wherein said SMES system comprises a superconducting coil having a predetermined number of identical superconductors wound around a larger, non-superconducting conductor.

15. An automatic hydraulic activation mechanism (AHAM) for automatically closing a shorting switch in a superconducting energy magnetic storage (SMES) system immersed in a dewar containing a cryogenic coolant comprising:
    (a) at least one hydraulic working fluid reservoir containing a working fluid in thermal contact with the cryogenic coolant, the working fluid being the cryogenic coolant;
    (b) at least one hydraulic actuator disposed to perform work upon an increase in working fluid pressure;
    (c) communicating means for communicating the increase in working fluid pressure to said hydraulic actuator; and
    (d) porous means for permitting cryogenic coolant in the dewar to seep into and out of the reservoir; wherein (i) upon a dump of liquid cryogenic coolant from the dewar, liquid cryogenic coolant in the reservoir becomes a gas and expands to provide the increase in working fluid pressure, and the gaseous cryogenic coolant slowly seeps into the dewar through the porous means to slowly decrease the pressure of the working fluid, the hydraulic actuator being operatively coupled to close the switch when the work is performed, and (ii) upon a fill of liquid cryogenic coolant into the dewar the coolant seeps into the reservoir to recharge the AHAM.

16. AHAM of claim 15 wherein elements a, b and c are completely disposed within the dewar.

17. AHAM of claim 15 further comprising hydraulic reset means for returning the shorting switch to the open position after it has been closed.

18. Automatic hydraulic activation mechanism (AHAM) for automatically actuating a shorting switch in a superconducting energy magnetic energy storage (SMES) system immersed in a dewar containing a cryogenic coolant comprising:
 (a) at least one hydraulic working fluid reservoir containing a working fluid in thermal contact with the cryogenic coolant, the working fluid being the cryogenic coolant;
 (b) at least one hydraulic actuator disposed to perform work upon an increase in working fluid pressure;
 (c) communicating means for communicating the increase in working fluid pressure to said hydraulic actuator;
 (d) porous means for permitting cryogenic coolant in the dewar to seep into and out of the reservoir, all of elements (a), (b), (c) and (d) being completely disposed within the dewar; and
 (e) hydraulic reset means for returning the shorting switches to the open position after they have been closed; wherein (i) upon a dump of liquid cryogenic coolant from the dewar, liquid cryogenic coolant in the reservoir becomes a gas and expands to provide the increase in working fluid pressure, and the gaseous cryogenic coolant slowly seeps into the dewar through the porous means to slowly decrease the pressure of the working fluid, the hydraulic actuator being operatively coupled to close the switch when the work is performed, and (ii) upon a fill of liquid cryogenic coolant into the dewar the coolant seeps into the reservoir to recharge the AHAM.

* * * * *